A. O. Gallup and E. A. Hewitt
Churn.
N°. 90,255.     Patented May 18, 1869.
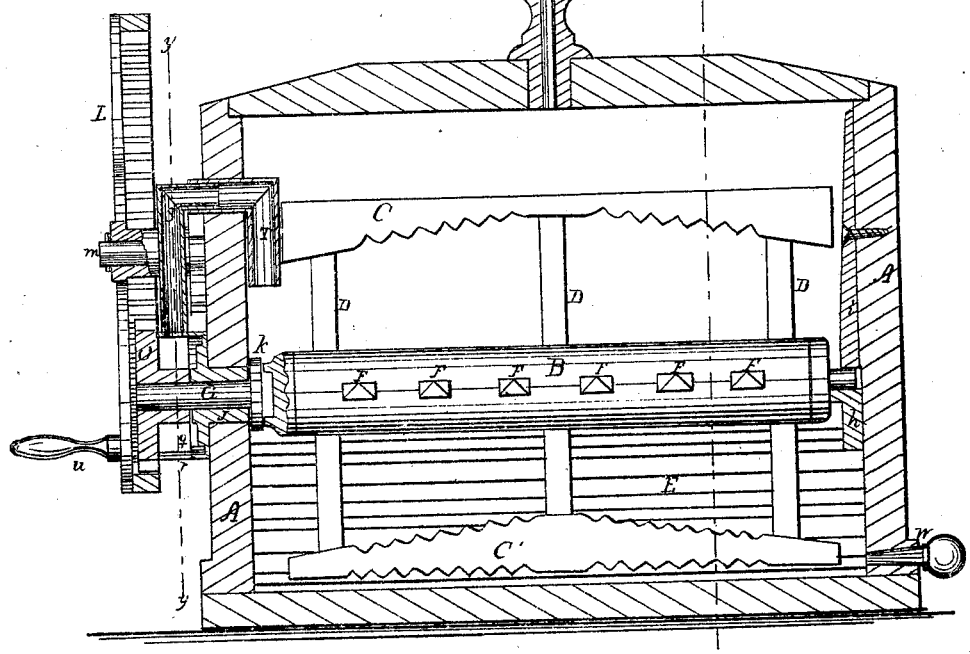
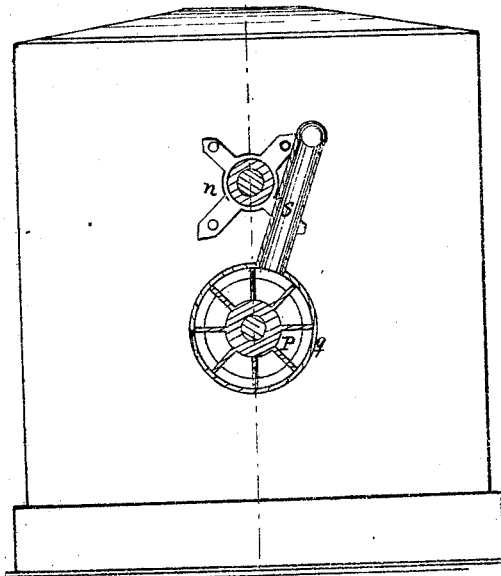
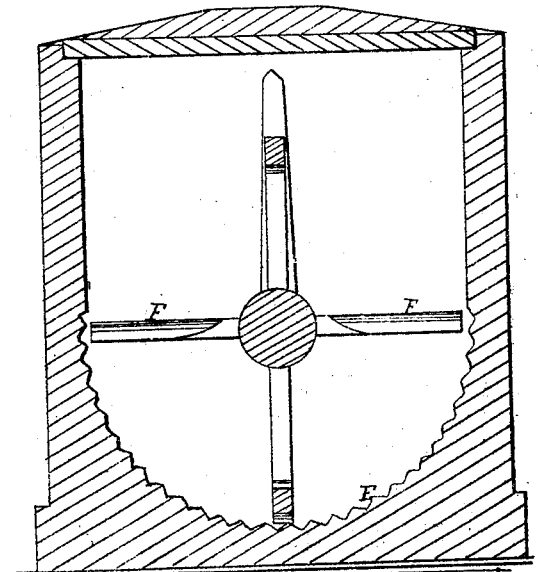
Witnesses.
A Bennickendorf
John F. Brooks
Inventors.
A. O. Gallup & E. A. Hewitt
per Munn & Co.
Attorneys

A. O. GALLUP, OF SALEM, AND E. A. HEWITT, OF GROTON, CONNECTICUT.

Letters Patent No. 90,255, dated May 18, 1869.

IMPROVEMENT IN CHURNS.

The Schedule referred to in these Letters Patent and making part of the same.

*To all whom it may concern:*

Be it known that we, A. O. GALLUP, of Salem, New London county, Connecticut, and E. A. Hewitt, of Groton, New London county, Connecticut, have invented a new and useful Improvement in Churns; and we do hereby declare that the following is a full, clear, and exact description thereof, which will enable others skilled in the art to make and use the same, reference being had to the accompanying drawing, forming part of this specification.

This invention relates to new and important improvements in butter-churning machines, whereby they are rendered more effective for the purposes intended than they have hitherto been; and The invention consists—

First, in the peculiar construction of a horizontal dasher, provided with serrated beaters, as hereinafter described;

Secondly, in combination with a dasher thus constructed, a corrugated bottom or sides, (either or both,) as hereinafter set forth;

Thirdly, in the peculiar arrangement of the triangular breakers or arms; and

Fourthly, in the combination of a blowing-wheel, its encompassing cylinder, and a peculiarly formed connecting-tube.

In the accompanying plate of drawings—

Figure 1 represents a vertical longitudinal section of the churn through the line $x\ x$ of fig. 2, showing the serrated beaters, and the form of the transverse arms on the shaft.

Figure 2 is a vertical cross-section of fig. 1, through the line $y\ y$, showing the blowing-wheel, and the cylinder in which it is confined, together with the pipe through which the air is discharged into the churn.

Figure 3 is a vertical cross-section of fig. 1, through the line $z\ z$, showing the serrated or corrugated bottom and sides of the churn, and the position of the beaters and transverse arms on the shaft.

Similar letters of reference indicate corresponding parts.

A represents the churn.

B is the dasher-shaft to which the arms are rigidly attached.

C C' represents the beaters, which are attached to the arms D.

The beater C', it will be seen, is serrated upon both edges, for more effectually operating upon the cream and bursting the globules. This is accomplished as it moves through the cream in contact with the serrated bottom and sides E.

The beater C is serrated on only one edge, the smooth straight edge acting as a scraper in its movement over the surface.

The transverse arms F are made triangular in cross-section from near the shaft to their extreme ends, and it will be seen that as they pass through the cream, the sharp-angle of one set of arms and the flat sides of the other set strike the cream, the former parting or cutting it, while the latter forces its way through, thoroughly agitating the cream, and changing the position of all the globules which it does not break.

The dasher is readily removed from the churn, one end of the shaft B being attached to the short pinion-shaft G by a socket-connection, while the other end is supported on the box $h$ on the end of the churn, and held in place by the button $i$.

The pinion-shaft G passes through the end of the churn in the box J, with the flange or collar and socket $k$ on its inner end, as seen in the drawing.

L represents the driving internal gear-wheel, to which the power for operating the churn is applied.

This wheel is supported by and revolved on a projecting arbor, $m$, fastened to the end of the churn by the spider $n$.

$o$ is the driving-pinion on the short shaft G.

Attached to the inner side of this pinion is the blowing-wheel P, which is confined in a drum, or cylinder $q$. Atmospheric air is admitted into this cylinder in any convenient manner.

In this example of our invention there is an orifice in the cylinder, as seen at $r$, but it may be admitted through the pinion $o$, if found more convenient or desirable.

The air which enters at $r$ is forced out of the cylinder, and into the churn through the pipe S.

This pipe is in two parts. The inner part T is removable, and turns down vertically, as seen in the drawing, for the purpose of discharging the current of air more directly into the cream, and also to prevent the cream from entering and obstructing it.

The force of the current of air discharged into the churn will of course depend upon the speed or velocity with which the blower is driven.

The driving gear-wheels multiply or increase the speed of the blower, and of the dasher, something more than three to one. Consequently, in moving the dasher through the cream at the speed obtained by turning the crank U in the ordinary manner, the cream is necessarily agitated violently, and thrown by the beaters and arms against the corrugated bottom and sides of the churn, with such force as to thoroughly break and separate the globules.

The process is of course adapted to milk as well as cream, the effect being the same in either case.

V represents a vent-hole through the top of the churn.

W is a faucet in the end of the churn, through which the buttermilk is drawn off.

We claim as new, and desire to secure by Letters Patent—

1. The dasher B, constructed as described, with the beaters C and C' serrated, as shown.

2. In combination with the dasher B, with the arms C and C', constructed as shown, the corrugated bottom and sides, or either, as set forth.

3. The arrangement of the arms F in the manner shown and described, so that the flat side of one beater shall follow the sharp edge of the other, as set forth.

4. In combination with the cylinder $q$, having the right-angled stem S T, the blowing-wheel P, when arranged on the outside of the churn, as and for the purpose set forth.

The above specification of our invention signed by us, this 6th day of February, 1869.

A. O. GALLUP.
E. A. HEWITT.

Witnesses:
FRANK BROCKLEY,
E. GREENE COLLINS.